2,782,204

BENZIMIDAZOLE COMPOUNDS

Leon E. Tenenbaum, Ardsley, N. Y., assignor to Nepera Chemical Co., Inc., Yonkers, N. Y., a corporation of New York No Drawing. Application July 1, 1955,
Serial No. 519,637

3 Claims. (Cl. 260—309.2)

This invention relates to certain novel N-alkyl-substituted benzimidazolium compounds and relates more particularly to those symmetrically substituted N-alkyl-benzimidazole compounds wherein the N-alkyl radical contains from 8 to 9 carbon atoms.

The novel compounds of this invention contain a quaternary nitrogen atom, and may be represented by the following general formula:

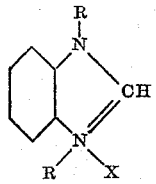

wherein R is a straight or branched chain alkyl group containing from 8 to 9 carbon atoms and X is one equivalent of an anion such as, for example, a chloride, iodide, bromide, phosphate or a sulfate ion.

An object of this invention is the preparation of N-alkyl-benzimidazole compounds which are particularly useful as antifungal agents. Other objects of this invention will appear from the following detailed description.

Certain alkyl-substituted benzimidazolium salts are known and some evidence of antibacterial activity has been observed. Surprisingly enough, however, the particular novel compounds comprising my invention exhibit a very unusual degree of fungicidal activity, a property which seems to be specific to the foregoing symmetrically substituted N-octyl and N-nonyl benzimidazolium salts. The symmetrically substituted compound in the above formula where R is a nonyl group is especially active in relatively low concentrations against fungi such as *Candida albicans* as well as *Trichophyton mentagrophytes*, *Sporotrichum schenckii* and *Aspergilla fumigatus*.

The compounds of this invention may be prepared by reacting benzimidazole under reflux in an inert solvent medium such as benzene, toluene, or ethanol, for example, with a stoichiometric excess of an octyl or nonyl halide such as octyl bromide, octyl chloride, nonyl chloride or nonyl bromide. After the reaction is complete, the N-alkyl-substituted benzimidazolium compound formed usually separates from solution upon cooling. It may then be separated and purified by recrystallization. The halogen present on the quaternary nitrogen of the N-alkyl-substituted benzimidazolium compound may be readily replaced by a sulfate group, for example, by reacting the quaternary compound with silver sulfate. The phosphate may be obtained by precipitating the ionizable halide with silver carbonate and the treatment of the soluble base with phosphoric acid.

A higher yield of the desired N-alkyl-substituted benzimidazolium salt may be obtained if the benzimidazole is first reacted with sodamide, or sodium methylate, and the resulting sodium compound reacted with the desired octyl or nonyl halide.

In order further to illustrate my invention but without being limited thereto, the following Examples are given:

Example I 59 parts by weight of benzimidazole are dissolved in about 240 parts by weight of ethanol, and 200 parts by weight of octyl bromide are added. The solution formed is heated under reflux for six hours. Upon cooling, 1,3-dioctyl-benzimidazolium bromide crystallizes out. The product has a melting point of 106–107° C. after recrystallization from water. Analysis for $C_{23}H_{39}N_2Br$ is—calculated: 6.64% N. Found: 6.65% N.

This compound is a highly effective fungicide against *Candida albicans* in concentrations as low as 0.37 milligram percent which is equivalent to a dilution of 1 part in 300,000. Against *Sporotrichum schenckii* it is effective in concentrations as low as 0.04 milligram percent.

Example II 59 parts by weight of benzimidazole are dissolved in about 240 parts by weight of ethanol and 210 parts by weight of nonyl bromide are added. The solution obtained is heated under reflux for six hours and then cooled. A crystalline precipitate of 1,3-di-nonyl-benzimidazolium bromide is obtained which is separated and recrystallized from water. The product has a melting point of 96–98° C. Analysis for $C_{25}H_{43}N_2Br$ is—calculated: 6.21% N. Found: 6.43% N.

This compound is an effective fungicide against *Candida albicans* in a concentration of 0.12 milligram percent, equivalent to a concentration of one part in 800,000. Against *Sporotrichum schenckii* it is effective in a concentration as low as 0.013 milligram percent.

Example III 0.2 mol of benzimidazole and 0.2 mole of sodamide are suspended in toluene and refluxed with agitation for 18 hours. At the end of this time the mixture is cooled, 0.4 mol. of nonyl bromide is added and the mixture now refluxed with stirring for another 18 hours. The reaction mixture is then filtered hot to remove the sodium bromide formed and, after cooling to 5° C., the product, 1,3-di-nonyl-benzimidazolium bromide crystallizes out. The product is then recrystallized from water. In a similar manner 1,3-di-octyl-benzimidazolium bromide is obtained using octyl bromide in the above procedure.

It is understood that the foregoing detailed description is given merely by way of illustration and that many variations may be made therein without departing from the spirit of my invention.

Having described my invention, what I desire to secure by Letters Patent is:

1. Compounds of the formula:

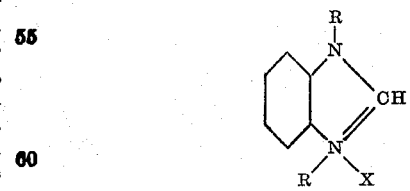

wherein R is an alkyl group containing 8 to 9 carbon atoms and X is one equivalent of an anion of the group consisting of chloride, bromide, iodide, phosphate and sulfate.

2. 1,3-di-octyl-benzimidazolium bromide.

3. 1,3-di-nonyl-benzimidazolium bromide.

References Cited in the file of this patent

Wright: Chemical Reviews, pp. 477–9, June 1951, vol. 48, No. 3, Williams and Wilkins Co., Baltimore 2, Md.